(12) United States Patent
Nakamura et al.

(10) Patent No.: US 11,815,130 B2
(45) Date of Patent: Nov. 14, 2023

(54) FOLLOWER BEARING

(71) Applicant: NIPPON THOMPSON CO., LTD., Tokyo (JP)

(72) Inventors: Tomoaki Nakamura, Mino (JP); Takafumi Kawashima, Mino (JP)

(73) Assignee: NIPPON THOMPSON CO., LTD., Tokyo (JP)

( * ) Notice: Subject to any disclaimer, the term of this patent is extended or adjusted under 35 U.S.C. 154(b) by 0 days.

(21) Appl. No.: 17/729,408

(22) Filed: Apr. 26, 2022

(65) Prior Publication Data

US 2022/0341487 A1 Oct. 27, 2022

(30) Foreign Application Priority Data

Apr. 27, 2021 (JP) ................................ 2021-075088

(51) Int. Cl.
| | |
|---|---|
| *F16C 33/58* | (2006.01) |
| *F16H 53/06* | (2006.01) |
| *F16C 19/26* | (2006.01) |

(52) U.S. Cl.
CPC ............ *F16C 33/588* (2013.01); *F16C 19/26* (2013.01); *F16C 33/581* (2013.01); *F16H 53/06* (2013.01)

(58) Field of Classification Search
CPC ...... F16C 19/26; F16C 33/581; F16C 33/583; F16C 33/588; F16H 53/06
See application file for complete search history.

(56) References Cited

U.S. PATENT DOCUMENTS

| | | | | |
|---|---|---|---|---|
| 2,770,508 | A * | 11/1956 | Smith | ................. F16C 33/7809 384/477 |
| 3,596,533 | A * | 8/1971 | Nightingale | ............. F16C 21/00 384/127 |
| 4,113,327 | A * | 9/1978 | Koch | ..................... F16C 13/006 384/485 |
| 9,982,768 | B2 * | 5/2018 | Hartnett | ................ F16C 13/006 |
| 10,274,013 | B2 * | 4/2019 | Pallini | .................... F16C 13/006 |
| 2023/0220880 | A1 * | 7/2023 | Nakamura | .............. F16C 33/58 384/569 |

FOREIGN PATENT DOCUMENTS

JP 2009191900 A 8/2009

* cited by examiner

*Primary Examiner* — James Pilkington
(74) *Attorney, Agent, or Firm* — BROWDY AND NEIMARK, P.L.L.C.

(57) ABSTRACT

A follower bearing includes an outer ring, rolling elements, and a cage retaining the rolling elements. The outer ring includes an annular first member made of steel, and an annular second member made of resin and covering an outer circumferential surface of the first member. The first member includes a tubular portion. The second member includes a first portion disposed on one side of the tubular portion in an axial direction and having a first opposing surface that opposes an outer circumferential surface of the cage in a radial direction, and a second portion disposed on the other side of the tubular portion in the axial direction and having a second opposing surface that opposes the outer circumferential surface of the cage in the radial direction. In the radial direction, the first and second opposing surfaces are each disposed on a more outer circumference side than a second raceway surface.

14 Claims, 10 Drawing Sheets

FOLLOWER BEARING

BACKGROUND OF THE INVENTION

1. Field of the Invention

The present invention relates to a follower bearing.

The present application claims priority based on Japanese Patent Application No. 2021-075088 filed on Apr. 27, 2021, the entire contents of which are incorporated herein by reference.

2. Description of the Related Art

A rolling bearing with an outer ring and a pully made of resin integrated into one piece is known (see, for example, Japanese Patent Application Laid-Open No. 2009-191900). According to Japanese Patent Application Laid-Open No. 2009-191900, the outer ring has, at its one end, a flange that faces radially outward. In Japanese Patent Application Laid-Open No. 2009-191900, one end face of the flange in the axial direction is exposed from the resin pulley to improve the heat dissipation of the outer ring.

SUMMARY OF THE INVENTION

In a follower bearing, it may be required to suppress operating noise and also to make the bearing less damaging to other members that come into contact with the outer ring. Adopting a configuration of covering the outer circumferential surface of the outer ring with resin can suppress operating noise and can make the bearing less damaging to other members. Further, in the follower bearing, the outer ring may be subjected to a load from the outer circumference side during operation. In such a case, the bearing may suffer deformation because the outer circumferential surface of the outer ring is covered with resin. Even under such circumstances, stable operation is required for the bearing.

Therefore, one of the objects is to provide a follower bearing that can suppress operating noise, is less damaging to other members, and can ensure stable operation of the bearing.

A follower bearing according to the present disclosure includes: an inner member having an annular first raceway surface on an outer circumferential surface thereof; an outer ring having an annular second raceway surface on an inner circumferential surface thereof, the second raceway surface opposing the first raceway surface; a plurality of rolling elements arranged on an annular raceway along the first and second raceway surfaces so as to contact the first and second raceway surfaces; and a cage that retains the plurality of rolling elements. The outer ring includes an annular first member made of steel, and an annular second member made of resin, the second member covering an outer circumferential surface of the first member. The first member includes a tubular portion having a hollow cylindrical shape and including the second raceway surface. The second member includes a first portion arranged on one side of the tubular portion in an axial direction and having a first opposing surface that opposes an outer circumferential surface of the cage in a radial direction, and a second portion arranged on another side of the tubular portion in the axial direction and having a second opposing surface that opposes the outer circumferential surface of the cage in the radial direction. In the radial direction, the first opposing surface and the second opposing surface are each arranged on a more outer circumference side than the second raceway surface.

According to the follower bearing described above, operating noise can be suppressed, damages to other members can be suppressed, and stable operation of the bearing can be ensured.

DESCRIPTION OF THE PREFERRED EMBODIMENTS

Outline of Embodiments

Figure 1:
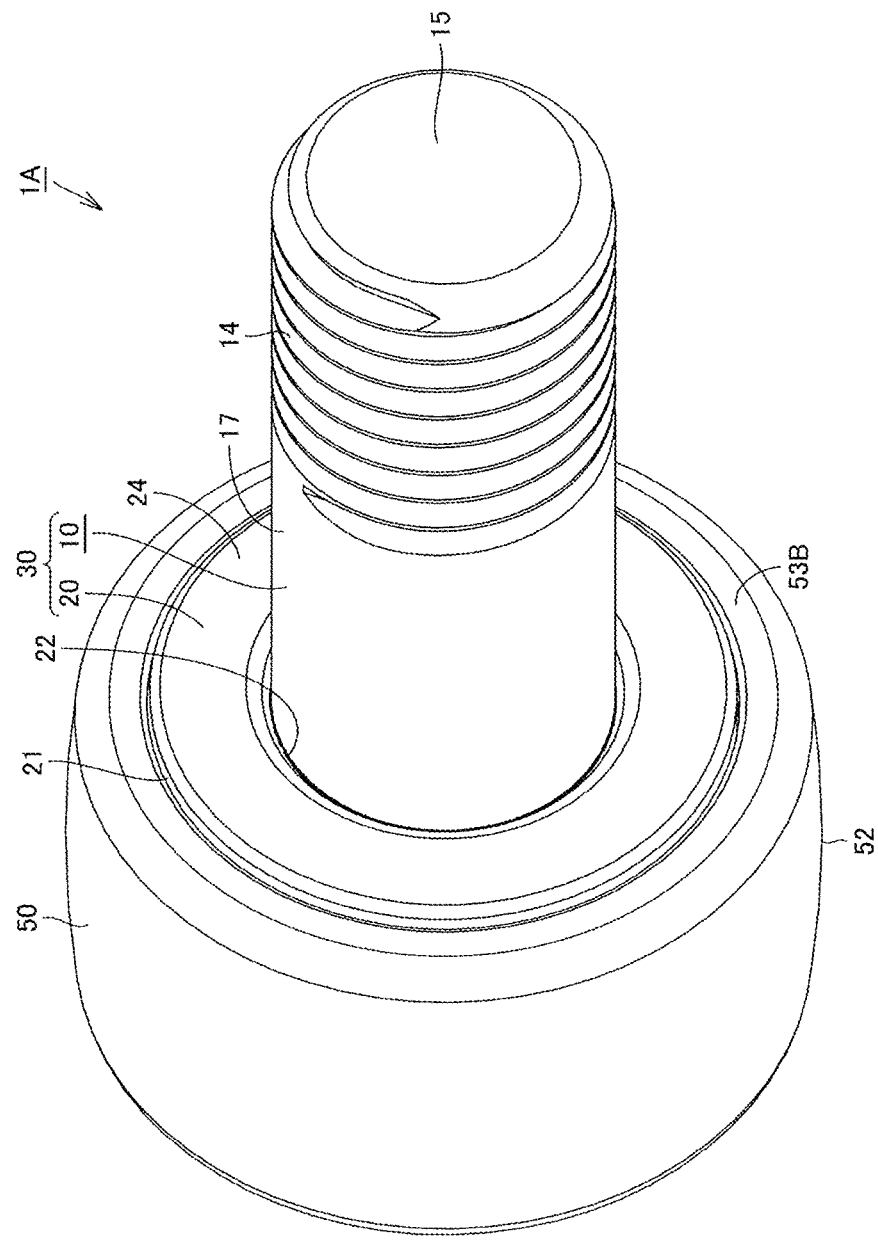
FIG. 1 is a schematic perspective view showing the structure of a follower bearing in an embodiment of the present disclosure.

A follower bearing of the present disclosure includes: an inner member having an annular first raceway surface on an outer circumferential surface thereof; an outer ring having an annular second raceway surface on an inner circumferential surface thereof, the second raceway surface opposing the first raceway surface; a plurality of rolling elements arranged on an annular raceway along the first and second raceway surfaces so as to contact the first and second raceway surfaces; and a cage that retains the plurality of rolling elements. The outer ring includes an annular first member made of steel, and an annular second member made of resin, the second member covering an outer circumferential surface of the first member. The first member includes a tubular portion having a hollow cylindrical shape and including the second raceway surface. The second member includes a first portion arranged on one side of the tubular portion in an axial direction and having a first opposing surface that opposes an outer circumferential surface of the cage in a radial direction, and a second portion arranged on another side of the tubular portion in the axial direction and having a second opposing surface that opposes the outer circumferential surface of the cage in the radial direction. In the radial direction, the first opposing surface and the second opposing surface are each arranged on a more outer circumference side than the second raceway surface.

In the follower bearing of the present disclosure, the outer ring includes the second member made of resin. This makes the bearing less damaging to other members coming into contact with the outer ring and achieves suppression of operating noise. The follower bearing of the present disclosure includes the cage that retains the plurality of rolling elements. This ensures, among others, stable retention of the posture of the rolling elements during operation of the bearing. During the bearing operation, the cage rotates together with the rolling elements. A follower bearing may suffer a load applied from the outer circumference side of the outer ring. When a load is applied to the outer ring, the second member made of resin may be deformed toward the inner circumference side. If this happens, the cage holding the rolling elements may come into contact with the second member, inhibiting the rotation of the cage.

In the follower bearing of the present disclosure, the second member made of resin includes the first portion disposed on one side of the tubular portion in the axial direction and the second portion disposed on the other side of the tubular portion. In the radial direction, the first opposing surface included in the first portion and the second opposing surface included in the second portion are each disposed on the more outer circumference side than the second raceway surface. With this, gaps are formed between the first opposing surface of the first portion and the outer circumferential surface of the cage and between the second opposing surface of the second portion and the outer circumferential surface of the cage. Therefore, even when the outer ring of the follower bearing suffers a load from the outer circumference side and the second member made of resin is deformed toward the inner circumference side, the risk of contact between the first opposing surface of the first portion and the outer circumferential surface of the cage and between the second opposing surface of the second portion and the outer circumferential surface of the cage can be reduced. As a result, the risk of contact between the second member of the outer ring and the cage, which would inhibit stable rotation of the cage, can be reduced. As such, according to the follower bearing described above, it is possible to suppress operating noise and make the bearing less damaging to other members, while ensuring stable operation of the bearing.

In the present disclosure, the "resin" includes rubber. That is, the second member may be composed of rubber. In the present disclosure, the "second member made of resin" includes a second member composed of fiber-reinforced resin. That is, the resin constituting the second member may include reinforcing fibers. For the reinforcing fibers, for example, glass fibers, carbon fibers, or the like may be adopted.

In the follower bearing described above, in a cross section of the follower bearing cut in a plane including a rotational axis thereof, the outer circumferential surface of the cage may extend straight along the axial direction. The first and second opposing surfaces may extend straight along the axial direction. With this configuration, when a flange portion is arranged on the rotational axis in the axial direction of the first and second portions, large contact area can be secured between the flange portion and the first and second portions in the axial direction. Therefore, the operation of the outer ring during the bearing operation can be stabilized and the load can be distributed when a thrust load is generated. As a result, more stable operation of the bearing can be ensured. As used herein, extending straight means that in the cross section including the rotational axis, the imaginary line indicating the rotational axis and the straight lines representing the outer circumferential surface, the first opposing surface, and the second opposing surface are parallel. Here, being parallel does not indicate being geometrically exactly parallel; rather, it includes ones with an angle of not greater than three degrees therebetween.

In the follower bearing described above, in a cross section of the follower bearing cut in a plane including its rotational axis, at least one of the first opposing surface and the second opposing surface may be inclined with respect to the axial direction in such a manner that a distance from the outer circumferential surface of the cage increases from a side closer to the tubular portion to a side farther from the tubular portion. With this configuration, when a load is applied from the outer circumference side of the outer ring, the arrangement relationship between the deformed first and/or second opposing surface(s) and the rotational axis and, hence, the outer circumferential surface of the cage can be made close to be parallel. This can reduce the risk of contact between the second member and the cage, and further ensure stable operation of the bearing.

In the follower bearing described above, at least one of the first portion and the second portion may include a tongue-shaped portion that extends to reach a region between the cage and the tubular portion. With this configuration, the tongue-shaped portion can greatly reduce the risk of contact between the cage and the tubular portion. This in turn suppresses the wear of the cage due to contact with the tubular portion. Therefore, the stable operation of the bearing can be ensured more reliably.

In the follower bearing described above, the tubular portion may have an opposing region that opposes the outer circumferential surface of the cage in the radial direction. With this configuration, even when the outer ring is deformed toward the inner circumference side due to a load applied from the outer circumference side or the like, the outer ring will come into contact with the cage in the opposing region of the tubular portion. This can reduce the risk of contact between the cage and the second member. It thus becomes easy to ensure smooth rotation of the cage.

In the follower bearing described above, the tubular portion may have an outer circumferential surface that extends straight along the axial direction. With this configuration, the tubular portion can be made relatively simple in shape, ensuring good productivity.

In the follower bearing described above, the first member may include a protruding portion that extends radially outward from the tubular portion. The protruding portion of such a configuration can further reduce the risk of the first and second members separating in the axial direction.

The follower bearing described above may further include a rotation suppression mechanism configured to suppress relative rotation of the second member in a circumferential direction with respect to the first member. With this configuration, the relative rotation of the second member with respect to the first member can be regulated, and the stable operation of the bearing can be ensured more reliably.

In the follower bearing described above, the rotation suppression mechanism may include a concave portion that is concave in a round hole shape from an outer circumferential surface of the tubular portion. The second member may have a portion that enters into the concave portion. With this configuration, the concave portion and the second member entering into the concave portion can suppress the relative rotation of the second member with respect to the first member. It can also regulate the movement in the axial direction of the second member relative to the first member. Such a configuration can be easily formed by providing the concave portion of the above configuration in the tubular portion and then pouring resin into the concave portion when providing the second member on the outer circumference side of the first member.

In the follower bearing described above, the cage may be a welded cage. The welded cage (welded retainer) has good productivity, so such a configuration can improve the productivity.

In the follower bearing described above, the resin constituting the second member may be composed of an elastomer. With this configuration, the vibration and impact loaded on the follower bearing can be absorbed efficiently. It is therefore possible to ensure more stable operation of the bearing.

In the follower bearing described above, the elastomer may be a thermoplastic elastomer. With this configuration, injection molding, for example, can be used to improve the productivity. For the thermoplastic elastomer, for example, at least one of the following may be selected: urethane elastomer, polyamide elastomer, polyester elastomer, polystyrene elastomer, polyolefin elastomer, and polyvinyl chloride elastomer. Furthermore, at least one of, for example, urethane elastomer, polyamide elastomer, and polyester elastomer may be selected as the thermoplastic elastomer.

In the follower bearing described above, the rolling elements may be rollers. This makes it easy to achieve sufficient load bearing capacity while restricting the cross-sectional height of the follower bearing.

DESCRIPTION OF SPECIFIC EMBODIMENTS

Specific embodiments of the follower bearing of the present disclosure will be described below with reference to the drawings. In the drawings referenced below, the same or corresponding portions are denoted by the same reference numerals and the description thereof will not be repeated.

Embodiment 1

Figure 2:
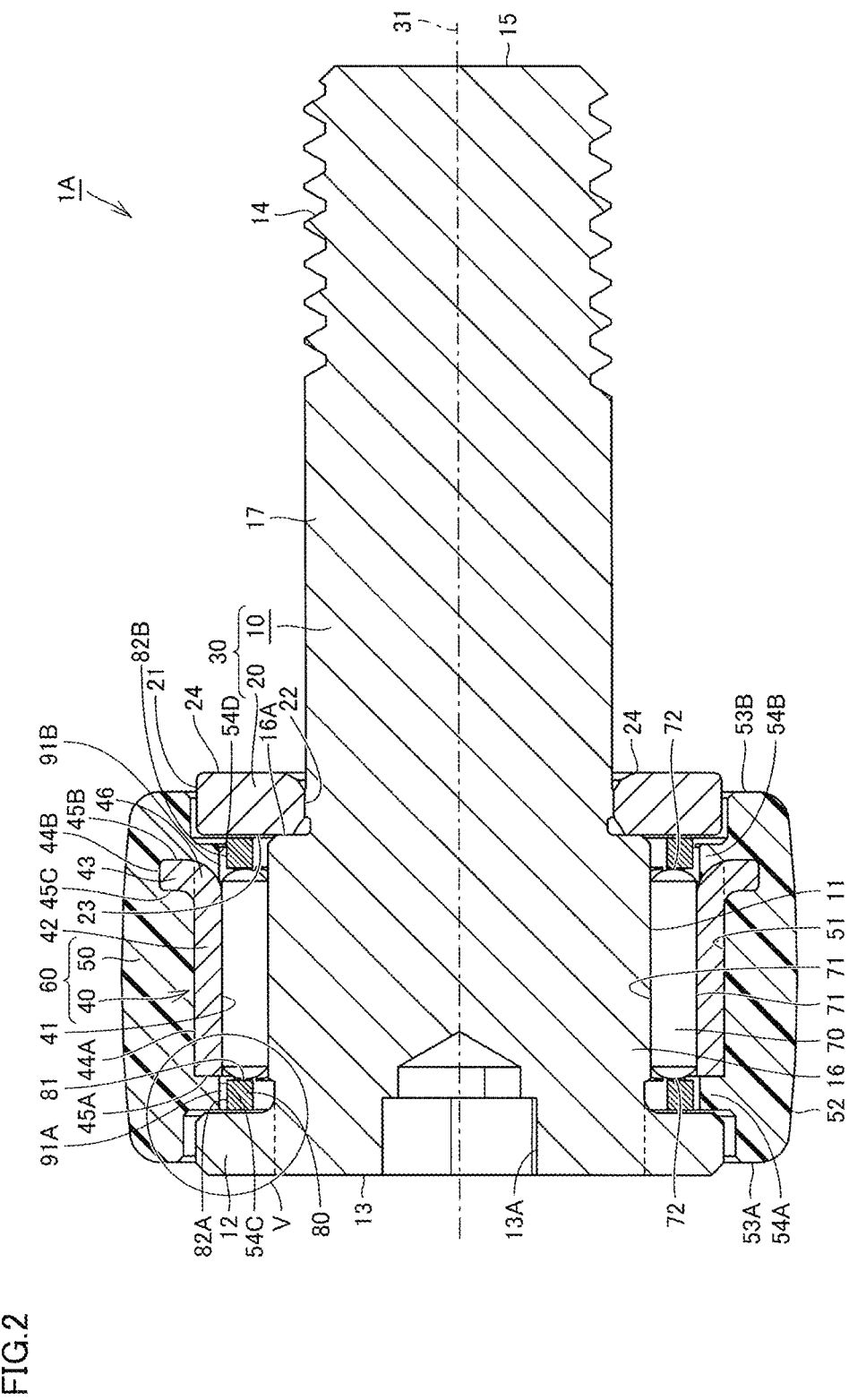
FIG. 2 is a schematic cross-sectional view showing the structure of the follower bearing.
Figure 3:
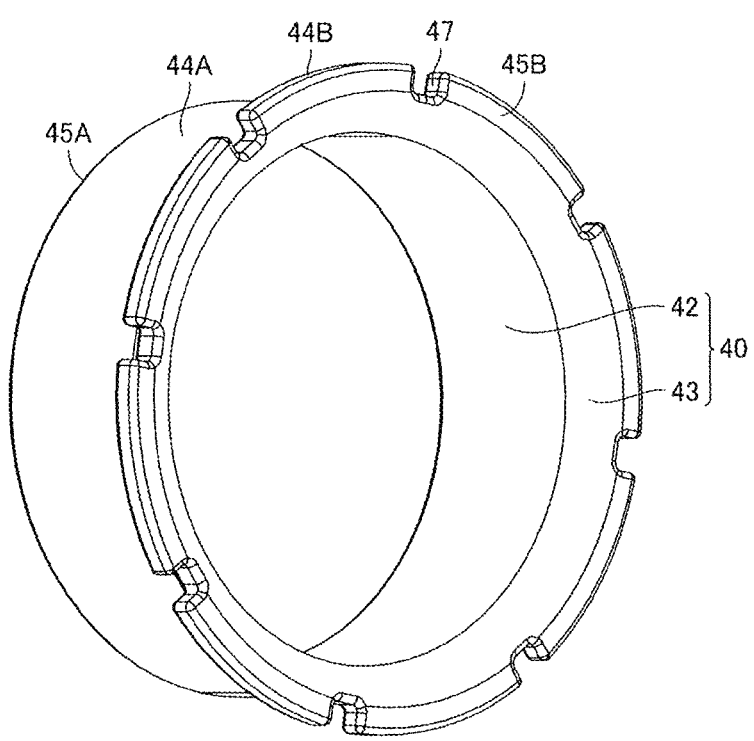
FIG. 3 is a schematic perspective view showing the structure of the first member of the outer ring.
Figure 4:
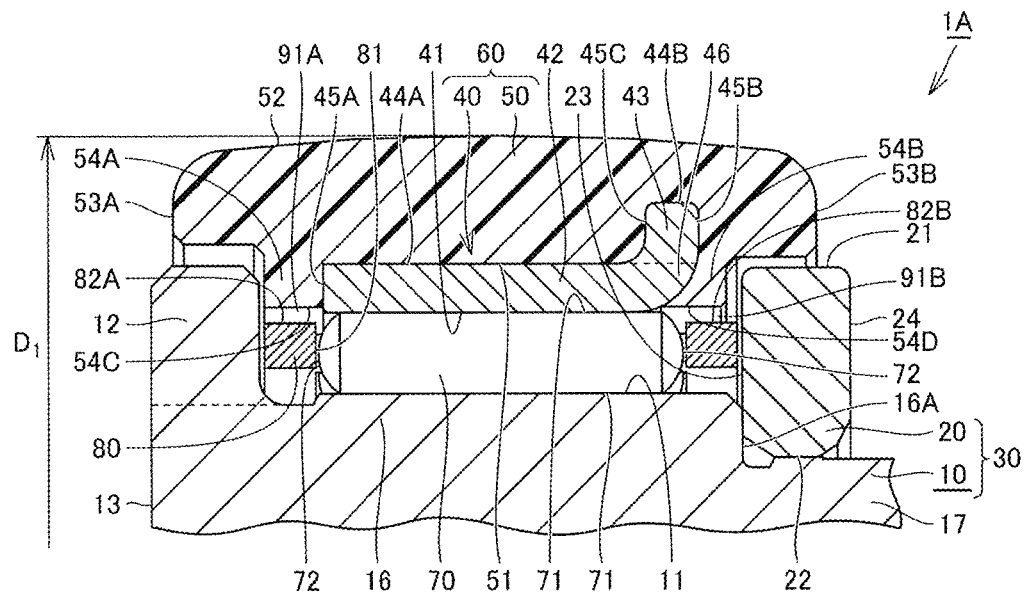
FIG. 4 is an enlarged schematic cross-sectional view of a portion of the follower bearing shown in FIG. 2.
Figure 5:
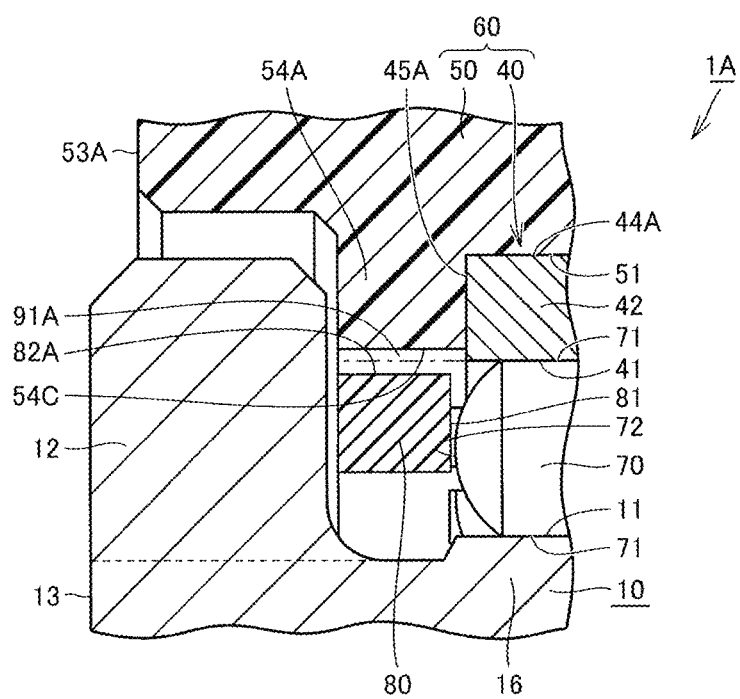
FIG. 5 is an enlarged schematic cross-sectional view of the region V in FIG. 2.

FIG. 1 is a schematic perspective view showing the structure of a follower bearing according to Embodiment 1 as an embodiment of the present disclosure. FIG. 2 is a schematic cross-sectional view showing the structure of the follower bearing shown in FIG. 1. FIG. 2 is a cross-sectional view of the follower bearing when cut in a plane including a rotational axis thereof. FIG. 3 is a schematic perspective view showing the structure of a first member of the outer ring shown in FIG. 1. FIG. 4 is an enlarged schematic cross-sectional view of a portion of the follower bearing shown in FIG. 2. FIG. 5 is an enlarged schematic cross-sectional view of the region V in FIG. 2.

Referring to FIGS. 1 to 5, the follower bearing 1A in the present embodiment has a shaft member 30 as an inner member, an outer ring 60, a plurality of rollers 70 as rolling elements, and a cage 80 that retains the rollers 70. In FIG. 2, a rotational axis 31, which is the central axis of the shaft member 30, is indicated with a long dashed dotted line.

The shaft member 30 includes a rod-shaped (solid cylindrical) body portion 10, a flange portion 12 formed at one end of the body portion 10 and having a larger diameter than the body portion 10, and a side plate 20, which is a ring coaxially installed on the body portion 10 to circumferentially surround a portion of an outer circumferential surface of the body portion 10. The body portion 10 has a first end face 13, which is one end in the axial direction, and a second end face 15, which is the other end on the opposite side of the first end face 13. The first end face 13 and the second end face 15 both have a circular planar shape.

The first end face 13 has a hexagon hole 13A of a regular hexagonal prismatic shape formed at its region including the region that intersects the rotational axis 31 as the central axis of the shaft member 30. The body portion 10 has a screw portion 14 with a helical threaded groove provided at its region including the (other) end on the second end face 15 side. With such a structure, the follower bearing 1A can be installed, for example, by passing the shaft member 30 through a housing hole and screwing a nut onto the screw portion 14, thereby securing the follower bearing 1A to a holding member.

The body portion 10 includes a solid cylindrical shaft portion 17 that includes the screw portion 14, and a large diameter portion 16 with a larger diameter than the shaft portion 17, arranged between the shaft portion 17 and the region where the flange portion 12 is located in the axial direction. The diameter of the large diameter portion 16 is smaller than that of the flange portion 12. The large diameter portion 16 has an outer circumferential surface on which a first raceway surface 11 of a cylindrical surface shape is formed. In other words, the shaft member 30 has the annular first raceway surface 11 on its outer circumferential surface. In the present embodiment, the flange portion 12 is a first convex portion that has an annular shape whose central axis coincides with that of the first raceway surface 11, is disposed on one side in the axial direction with respect to the first raceway surface 11, and protrudes radially outward from the outer circumference of the body portion 10. The outer circumference of the body portion 10 in the region where the flange portion 12 is located is indicated with dashed lines in FIGS. 2, 4, and 5.

The annular side plate 20 has a first end face 23 as one end face, a second end face 24 as another end face, an outer circumferential surface 21, and an inner circumferential surface 22. The first end face 23 and the second end face 24 are parallel. The outer circumferential surface 21 and the inner circumferential surface 22 are concentric cylindrical surfaces. The side plate 20 is disposed such that its first end face 23 contacts a stepped surface 16A (see FIGS. 2 and 4) of the large diameter portion 16 which is its end face (stepped portion) on the shaft portion 17 side in the axial direction. The side plate 20 has an inner circumference (diameter of the inner circumferential surface 22) that corresponds to the outer circumference of the shaft portion 17. The side plate 20 is press-fitted to the shaft portion 17 and is fixed to the shaft portion 17. In the present embodiment, the side plate 20 is a second convex portion that has an annular shape whose central axis coincides with that of the first raceway surface 11, is disposed on the other side in the axial direction with respect to the first raceway surface 11, and protrudes radially outward from the outer circumference of the body portion 10. The shaft member 30 is made of steel, such as carbon steel for machine structural use, alloy steel for machine structural use, bearing steel, or the like. Of the shaft member 30, a region including at least the first raceway surface 11 of the body portion 10 may be quench-hardened. A part or the whole of the side plate 20 may also be quench-hardened.

The outer ring 60 has, on its inner circumferential surface, an annular second raceway surface 41 that opposes the first raceway surface 11. The outer ring 60 includes a first member 40 and a second member 50. The first member 40 includes a tubular portion 42 having a hollow cylindrical shape and including the second raceway surface 41, and a protruding portion 43 that extends radially outward from the tubular portion 42. The first member 40 is made of steel. For the steel constituting the first member 40, mild steel, carbon steel for machine structural use, alloy steel for machine structural use, or the like can be adopted. The first member 40 may be quench-hardened. The first member 40 may be formed by press working or drawing using a steel plate made of mild steel, for example.

The tubular portion 42 has the second raceway surface 41 as the inner circumferential surface, an outer circumferential surface 44A, a first end face 45A as one end face in the axial direction, and an end portion 46 on the other end in the axial direction. The first member 40 includes the second raceway surface 41. The first end face 45A of the first member 40 and the flange portion 12 face each other. That is, the flange portion 12 and the first member 40 face each other in the axial direction.

The tubular portion 42 and the protruding portion 43 are equal in thickness. In the present embodiment, the outer circumferential surface 44A is of a shape that extends straight along the axial direction. That is, the outer circumferential surface 44A has no concave portion that reduces the thickness. With this configuration, the tubular portion 42 can be made relatively simple in shape, ensuring good productivity. The first member 40 is produced, for example, by preparing an annular member, bending its one end to the outer circumference side to form the protruding portion 43 of a flange shape, and maintaining the remaining portion as it is to serve as the tubular portion 42.

The protruding portion 43 is connected to the end portion 46 on the other end in the axial direction of the tubular portion 42. The protruding portion 43 is of a plate shape. The protruding portion 43 has an annular shape that is continuous throughout the circumferential direction of the first member 40. The protruding portion 43 has a second end face 45B, which is an end face on the other end in the axial direction, an outer circumferential surface 44B, and a side surface 45C located on the opposite side in the axial direction of the second end face 45B. The boundary between the end portion 46 and the protruding portion 43 is indicated with a dashed line in FIGS. 2 and 4. The second end face 45B and the first end face 23 of the side plate 20 face each other. That is, the side plate 20 and the first member 40 face each other in the axial direction.

The protruding portion 43 has a notch 47 formed thereon, which is concave radially inward (see particularly FIG. 3). A plurality of notches 47 are formed at intervals in the circumferential direction. The notches 47 are formed to penetrate the plate-like protruding portion 43 in the thickness direction.

The second member 50 has an annular shape. The second member 50 is made of resin. Specifically, the second member 50 is composed of urethane rubber. The resin constituting the second member 50 may be, for example, at least one resin selected from the group consisting of polyamide, polyacetal, polyphenylene sulfide, polyester, polyamide-imide, polyimide, polyether ether ketone, and polyurethane. The resin constituting the second member 50 may also be composed of an elastomer. With this, the vibration and impact loaded on the follower bearing 1A can be absorbed efficiently. Therefore, it is possible to ensure more stable operation of the bearing. The elastomer may be a thermoplastic elastomer. With this, productivity can be improved by using injection molding, for example. For the thermoplastic elastomer, for example, at least one of the following may be selected: urethane elastomer, polyamide elastomer, polyester elastomer, polystyrene elastomer, polyolefin elastomer, and polyvinyl chloride elastomer. Furthermore, at least one of urethane elastomer, polyamide elastomer, and polyester elastomer, for example, may be selected as the thermoplastic elastomer. The same applies to the cases shown in the following embodiments. The second member 50 is disposed coaxially with the first member 40. The second member 50 covers the outer circumferential surfaces 44A, 44B of the first member 40 over the entire area. The second member 50 also covers the first end face 45A, the second end face 45B, and the side surface 45C of the first member 40. In other words, the protruding portion 43 has both sides in the axial direction filled with the second member 50.

The second member 50 has an inner circumferential surface 51, an outer circumferential surface 52, a first end face 53A, and a second end face 53B. The second member 50 includes a first portion 54A that has an annular shape whose central axis coincides with that of the first raceway surface 11 and enters into between the flange portion 12 as the first convex portion and the first member 40. The first portion 54A is disposed on one side of the tubular portion 42 in the axial direction. The first portion 54A is formed over the entire circumference of the inner circumferential surface 51. The second member 50 also includes a second portion 54B that has an annular shape whose central axis coincides with that of the first raceway surface 11 and enters into between the side plate 20 as the second convex portion and the first member 40. The second portion 54B is disposed on the other side of the tubular portion 42 in the axial direction. The second portion 54B is formed over the entire circumference of the inner circumferential surface 51. Furthermore, although not shown in the figure, the second member 50 also enters into the notches 47 described above. The notches 47 and the second member 50 that has entered into the notches 47 serve as a rotation suppression mechanism to suppress the relative rotation of the second member 50 in the circumferential direction with respect to the first member 40.

The outer circumferential surface 52 of the second member 50 is configured to be convex such that the center in the axial direction protrudes the most. The outer circumferential surface 52 of the second member 50 is configured such that its diameter gradually decreases from the center in the axial direction to both ends in the axial direction. That is, the outer ring 60 has an outer circumference $D_1$ configured to be the largest at the center in the axial direction.

The cage 80 has an annular shape. In the present embodiment, the cage 80 is a welded cage. The use of a welded cage as the cage 80 leads to improved productivity. Although the cage 80 is made of steel, a cage made of resin can also be adopted. The cage 80 is placed in a space sandwiched between the shaft member 30 and the outer ring 60, concentrically with the shaft member 30 and the outer ring 60. The cage 80 has a plurality of pockets 81 arranged at equal intervals in the circumferential direction. In each of the plurality of pockets 81, one of the rollers 70 is disposed. The plurality of rollers 70, thus held by the cage 80, are arranged on an annular raceway along the first and second raceway surfaces 11 and 41 so as to contact the first and second raceway surfaces 11 and 41. Each roller 70 has a solid cylindrical shape. The roller 70 has an outer circumferential surface 71 of a cylindrical surface shape and a pair of end faces 72 of a spherical shape. The end faces 72 of the roller 70 may be flat. The roller 70 contacts the first raceway surface 11 and the second raceway surface 41 at its outer circumferential surface 71. The rollers 70 are made of steel such as bearing steel, for example. The rollers 70 may be quench-hardened.

The first portion 54A has a first opposing surface 54C that opposes an outer circumferential surface 82A of the cage 80 in the radial direction. In the radial direction, the first opposing surface 54C is located on the outer circumference side compared to the second raceway surface 41. The second portion 54B has a second opposing surface 54D that opposes an outer circumferential surface 82B of the cage 80 in the radial direction. In the radial direction, the second opposing surface 54D is located on the outer circumference side compared to the second raceway surface 41. That is, in the radial direction, the first opposing surface 54C and the second opposing surface 54D are each located on the more outer circumference side than the second raceway surface 41. With this configuration, a radial gap 91A can be formed between the outer circumferential surface 82A of the cage 80 and the first opposing surface 54C. Further, a radial gap 91B can be formed between the outer circumferential surface 82B of the cage 80 and the second opposing surface 54D. In a cross section of the follower bearing 1A cut in a plane including its rotational axis 31, the outer circumferential surfaces 82A and 82B of the cage 80 both extend straight along the axial direction. The first opposing surface 54C and the second opposing surface 54D extend straight along the axial direction. That is, the line representing the outer circumferential surface 82A of the cage 80 and the line representing the first opposing surface 54C are parallel to each other. The line representing the outer circumferential surface 82B of the cage 80 and the line representing the second opposing surface 54D are parallel to each other.

In the follower bearing 1A of the above embodiment, the shaft member 30, the outer ring 60, the cage 80, and the plurality of rollers 70 are arranged in the above-described manner, thereby allowing the outer ring 60 to rotate circumferentially relative to the shaft member 30.

In the follower bearing 1A of the above embodiment, the outer ring 60 includes the second member 50 made of resin. This makes the bearing less damaging to other members that contact the outer ring 60, and achieves suppression of operating noise. The follower bearing 1A of the present disclosure also includes the cage 80 that retains a plurality of rollers 70 as rolling elements. This ensures, for example, the stable retention of the posture of the rollers 70 during operation of the bearing. During the bearing operation, the cage 80 rotates together with the rollers 70.

Here, the follower bearing 1A may suffer a load applied from the outer circumference side of the outer ring 60. When a load is applied to the outer ring 60, the second member 50 made of resin may be deformed toward the inner circumference side. If this happens, the cage 80 holding the rollers 70 may come into contact with the second member 50, inhibiting the rotation of the cage.

Figure 6:
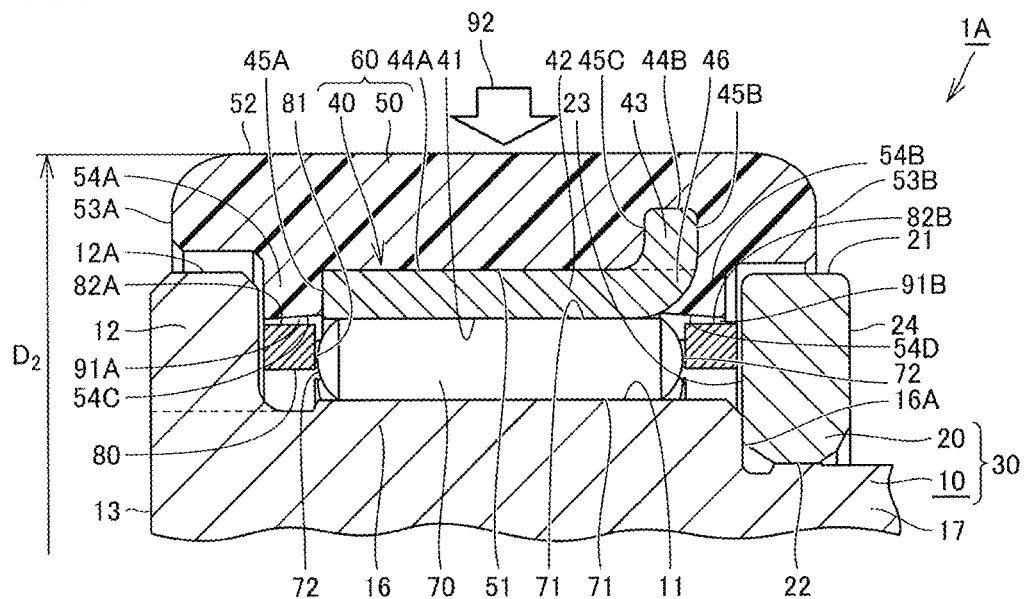
FIG. 6 is a schematic cross-sectional view of a portion of the follower bearing when a load is applied from an outer circumference side of the outer ring.
Figure 7:
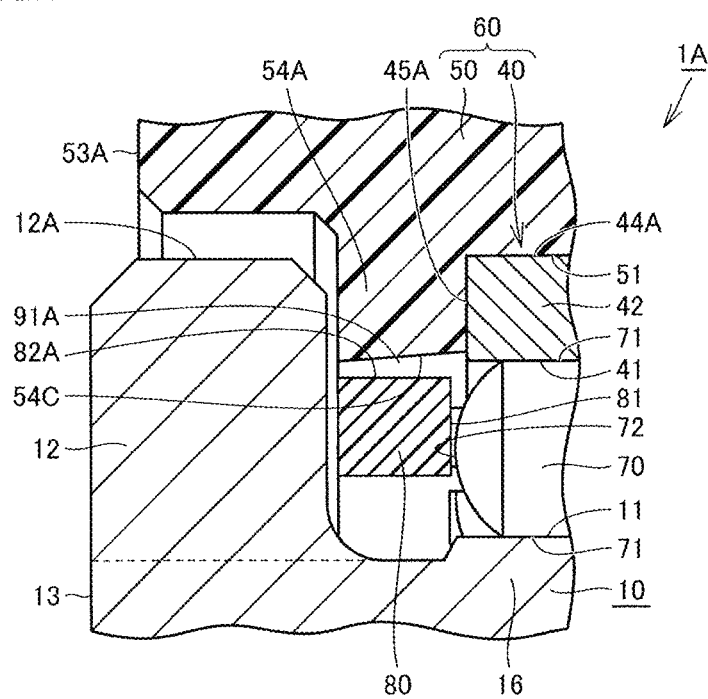
FIG. 7 is a schematic cross-sectional view of a portion of the follower bearing when a load is applied from the outer circumference side of the outer ring.

This will now be described. FIGS. 6 and 7 are schematic cross-sectional views showing a portion of the follower bearing 1A when a load is applied from the outer circumference side of the outer ring. FIG. 7 is an enlarged schematic cross-sectional view of the region V in FIG. 2.

Referring to FIGS. 6 and 7, a load 92, indicated by the arrow, may be applied from the outer circumference side of the outer ring 60, in this case from the outer circumference side of the second member 50. When this happens, the second member 50 is deformed because it is composed of urethane rubber. Specifically, with the outer circumferential surface 52 of the second member 50 having a shape in which the center in the axial direction protrudes the most, the outer circumferential surface 52 is depressed and becomes flat. The inner circumference side of the second member 50 is also deformed due to the applied load 92. In this case, as the tubular portion 42 is made of steel, the amount of deformation of the first opposing surface 54C toward the inner circumference side is small on the side close to the tubular portion 42, and it becomes larger on the outside in the axial direction, or, increases with increasing distance from the tubular portion 42 in the axial direction. That is, the inner circumference of the first opposing surface 54C decreases with increasing distance from the tubular portion 42 in the axial direction. The same tendency applies to the second opposing surface 54D.

Here, in the follower bearing 1A of the present disclosure, the first opposing surface 54C and the second opposing surface 54D are each disposed on the more outer circumference side than the second raceway surface 41 in the radial direction. The radial gap 91A is formed between the outer circumferential surface 82A of the cage 80 and the first opposing surface 54C, and the radial gap 91B is formed between the outer circumferential surface 82B of the cage 80 and the second opposing surface 54D. Therefore, even when the outer ring 60 of the follower bearing 1A is subjected to a load 92 from the outer circumference side and the second member 50 made of resin is deformed toward the inner circumference side, the risk of contact between the first opposing surface 54C of the first portion 54A and the outer circumferential surface 82A of the cage 80 and between the second opposing surface 54D of the second portion 54B and the outer circumferential surface 82B of the cage 80 can be reduced. As a result, the risk of the second member 50 of the outer ring 60 and the cage 80 coming into contact with each other and inhibiting the stable rotation of the cage 80 can be reduced. As such, according to the follower bearing 1A described above, it is possible to suppress operating noise and make the bearing less damaging to other members, while ensuring stable operation of the bearing.

In the follower bearing 1A of the above embodiment, in a cross section of the follower bearing 1A cut in the plane including its rotational axis 31, the outer circumferential surfaces 82A, 82B of the cage 80 extend straight along the axial direction. The first opposing surface 54C and the second opposing surface 54D extend straight along the axial direction. It is thus possible to secure large contact areas between the flange portion 12 and the first portion 54A and between the side plate 20 and the second portion 54B in the axial direction. Therefore, the operation can be stabilized by, for example, suppressing the riding of the outer ring 60 onto the flange portion 12 and the side plate 20 during the bearing operation. Further, the load when a thrust load is generated due to misalignment or the like can be distributed. As a result, the follower bearing 1A with this configuration is a follower bearing that can ensure more stable operation of the bearing. It should be noted that whether to adopt the configuration of Embodiment 1 above or the configuration of Embodiment 2 is determined, for example, depending on the radial dimensions of the flange portion 12 and the side plate 20, the environment in which the follower bearing is used, and so on.

In the follower bearing 1A of the above embodiment, the first member 40 includes the tubular portion 42 having a hollow cylindrical shape and including the second raceway surface 41, and the protruding portion 43 extending radially outward from the tubular portion 42. Both sides of the protruding portion 43 in the axial direction are filled with the second member 50. This can reduce the risk of the first member 40 and the second member 50 separating in the axial direction. The follower bearing 1A thus is a follower bearing that can be improved in reliability.

In the follower bearing 1A of the above embodiment, the protruding portion 43 is connected to the end portion 46 in the axial direction of the tubular portion 42. Therefore, the first member 40 having the protruding portion 43 of such a configuration can be easily produced by using press working, drawing, or the like. It should be noted that the shape of the protruding portion 43 is not limited to the above embodiment. Any shape such as the shape in which the protruding portion 43 is bent radially outward and then bent back toward the outer circumferential surface 44A side of the tubular portion 42, for example, can be selected as appropriate. The protruding portion 43 may be formed at each end in the axial direction of the tubular portion 42.

In the follower bearing 1A of the above embodiment, the protruding portion 43 has an annular shape that continues throughout the circumferential direction of the first member 40. The follower bearing 1A including the first member 40 with such a configuration is a follower bearing that can further reduce the risk of the first member 40 and the second member 50 separating in the axial direction.

In the follower bearing 1A of the above embodiment, the protruding portion 43 has the notch 47 formed thereon, which is concave radially inward. This allows the second member 50 to enter into the notch 47. The follower bearing 1A thus is a follower bearing that can regulate the relative rotation of the second member 50 with respect to the first member 40.

In the follower bearing 1A of the above embodiment, a plurality of notches 47 are formed at intervals in the circumferential direction. The follower bearing 1A thus is a follower bearing that can further regulate the relative rotation of the second member 50 with respect to the first member 40.

In the follower bearing 1A of the above embodiment, the shaft member 30 includes the body portion 10 including the first raceway surface 11, and the flange portion 12 as the first convex portion that has an annular shape whose central axis coincides with that of the first raceway surface 11, is disposed on one side in the axial direction with respect to the first raceway surface 11, and protrudes radially outward from the outer circumference of the body portion 10. The second member 50 includes the first portion 54A that has an annular shape whose central axis coincides with that of the first raceway surface 11 and enters into between the flange portion 12 and the first member 40. The follower bearing 1A thus is a follower bearing that can avoid contact between the flange portion 12 and the first member 40 in the axial direction.

In the follower bearing 1A of the above embodiment, the shaft member 30 includes the side plate 20 as the second convex portion that has an annular shape whose central axis coincides with that of the first raceway surface 11, is disposed on the other side in the axial direction with respect to the first raceway surface 11, and protrudes radially outward from the outer circumference of the body portion 10. The second member 50 includes the second portion 54B that has an annular shape whose central axis coincides with that of the first raceway surface 11 and enters into between the side plate 20 and the first member 40. The follower bearing 1A thus is a follower bearing that can avoid contact between the side plate 20 and the first member 40 in the axial direction.

Figure 8:
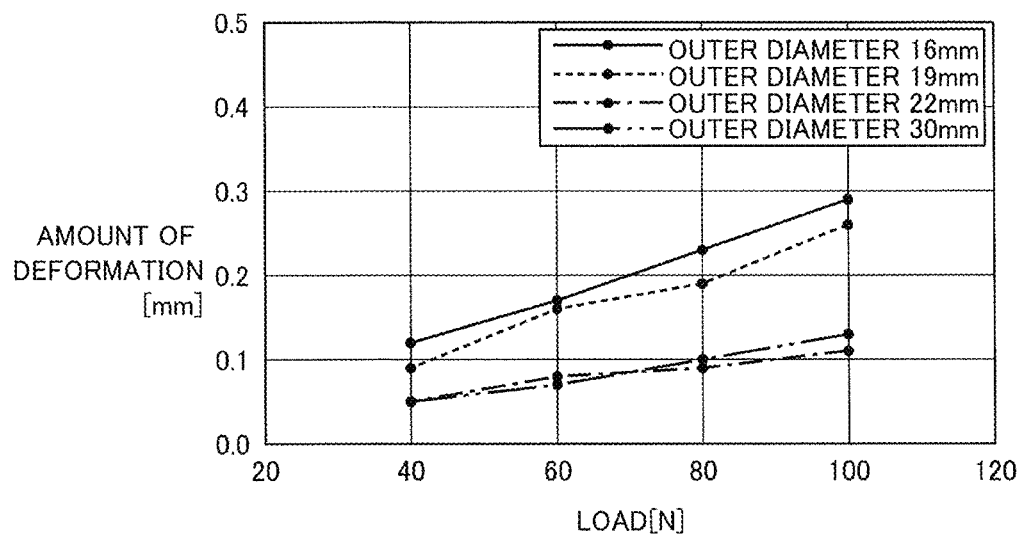
FIG. 8 is a graph showing a relationship between load and amount of deformation when the dimension of the outer circumference of the follower bearing is changed.

Here, the radial lengths of the gaps 91A and 91B may be adjusted according to the amount of displacement and the load anticipated. FIG. 8 is a graph showing a relationship between the load and the amount of deformation when the dimension of the outer circumference of the follower bearing 1A is changed. In FIG. 8, the vertical axis represents the amount of deformation (mm), and the horizontal axis represents the load (N). The graph shows the cases where the dimension of the outer circumference $D_1$ is set to be 16 mm, 19 mm, 22 mm, and 30 mm. Referring to FIG. 8, for example in the case where the dimension of the outer circumference $D_1$ is 16 mm and a load of 100 N is anticipated, the amount of deformation takes a value slightly smaller than 0.3 mm. In the case where the dimension of the outer circumference $D_1$ is 30 mm and a load of 100 N is anticipated, the amount of deformation takes a value slightly larger than 0.1 mm. These values may be taken into consideration to specify the radial dimensions of the gaps 91A and 91B, i.e., the positions in the radial direction of the first and second opposing surfaces 54C and 54D.

Embodiment 2

Figure 9:
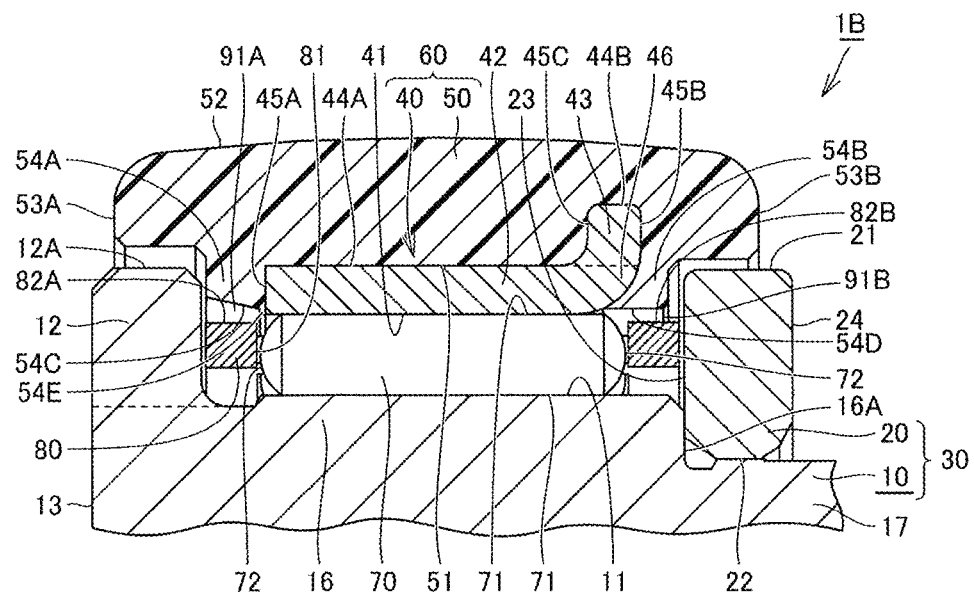
FIG. 9 is a schematic cross-sectional view of a portion of a follower bearing according to Embodiment 2.
Figure 10:
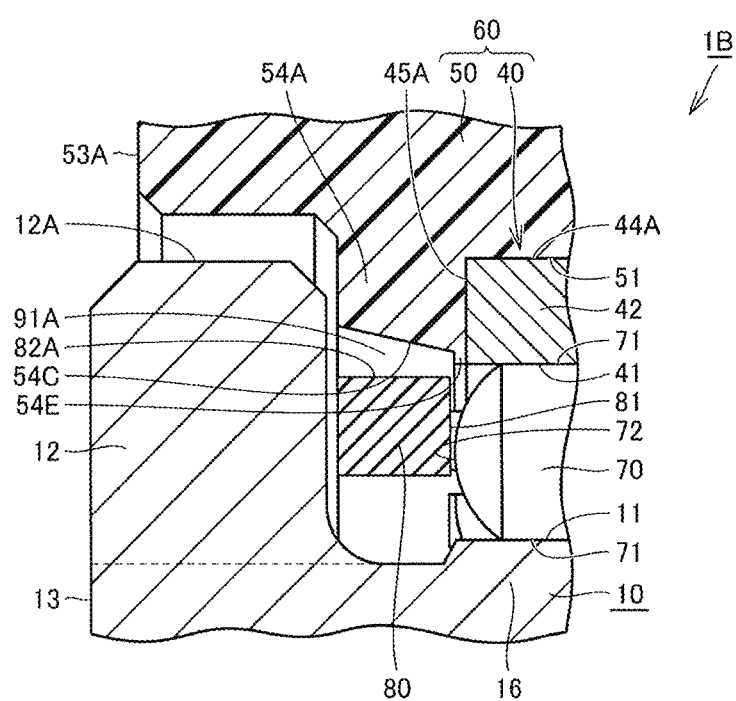
FIG. 10 is an enlarged schematic cross-sectional view of a portion of the follower bearing shown in FIG. 9.

A description will now be made of another embodiment, Embodiment 2. FIG. 9 is a schematic cross-sectional view of a portion of the follower bearing according to Embodiment 2. FIG. 10 is an enlarged schematic cross-sectional view of a portion of the follower bearing shown in FIG. 9. The follower bearing of Embodiment 2 differs from that of Embodiment 1 in that the first and second opposing surfaces are different in shape.

Referring to FIGS. 9 and 10, in a cross section of the follower bearing 1B according to Embodiment 2 cut in a plane including its rotational axis, the first opposing surface 54C is inclined with respect to the axial direction such that its distance from the outer circumferential surface 82A of the cage 80 increases from the side closer to the tubular portion 42 to the side farther from the tubular portion 42. Further, in the follower bearing 1B, the first portion 54A includes a tongue-shaped portion 54E that extends to reach a region between the cage 80 and the tubular portion 42. The tongue-shaped portion 54E is formed to extend radially inward. The tongue-shaped portion 54E is formed in a continuous annular shape.

Here, when a load is applied from the outer circumference side of the outer ring 60, the second member 50, specifically the first portion 54A of the second member 50, is recessed toward the inner circumference side, with a greater deformation amount in the bearing outer region close to the flange portion 12 than in the bearing inner region far from the flange portion 12. In the present embodiment, the first opposing surface 54C is inclined with respect to the axial direction, as described above, such that its distance from the outer circumferential surface 82A of the cage 80 increases from the side closer to the tubular portion 42 to the side farther from the tubular portion 42. Therefore, when a load is applied from the outer circumference side of the outer ring 60, the arrangement relationship between the deformed first opposing surface 54C and the rotational axis 31 and, hence, the outer circumferential surface 82A of the cage 80 can be made close to be parallel. This can reduce the risk of contact between the second member 50 and the cage 80, and further ensure the stable operation of the bearing.

Further, according to the present embodiment, the tongue-shaped portion 54E can greatly reduce the risk of contact between the cage 80 and the tubular portion 42. This can suppress the wear of the cage 80 due to the contact with the tubular portion 42. Therefore, the stable operation of the bearing can be ensured more reliably.

In the above embodiment, the first opposing surface 54C is configured such that its distance from the outer circumferential surface 82A of the cage 80 increases from the side closer to the tubular portion 42 to the side farther from the tubular portion 42. However, not limited to this case, at least one of the first opposing surface 54C and the second opposing surface 54D may be inclined with respect to the axial direction such that the distance from the outer circumferential surface 82A, 82B of the cage 80 increases from the side closer to the tubular portion 42 to the side farther from the tubular portion 42.

In the above embodiment, the first portion 54A includes the tongue-shaped portion 54E that extends to reach the region between the cage 80 and the tubular portion 42. However, not limited to this case, at least one of the first portion 54A and the second portion 54B may include a tongue-shaped portion that extends to reach the region between the cage 80 and the tubular portion 42. A plurality of such tongue-shaped portions may be provided at intervals in the circumferential direction, or a tongue-shaped portion may be provided in only one location in the circumferential direction.

Embodiment 3

Figure 11:
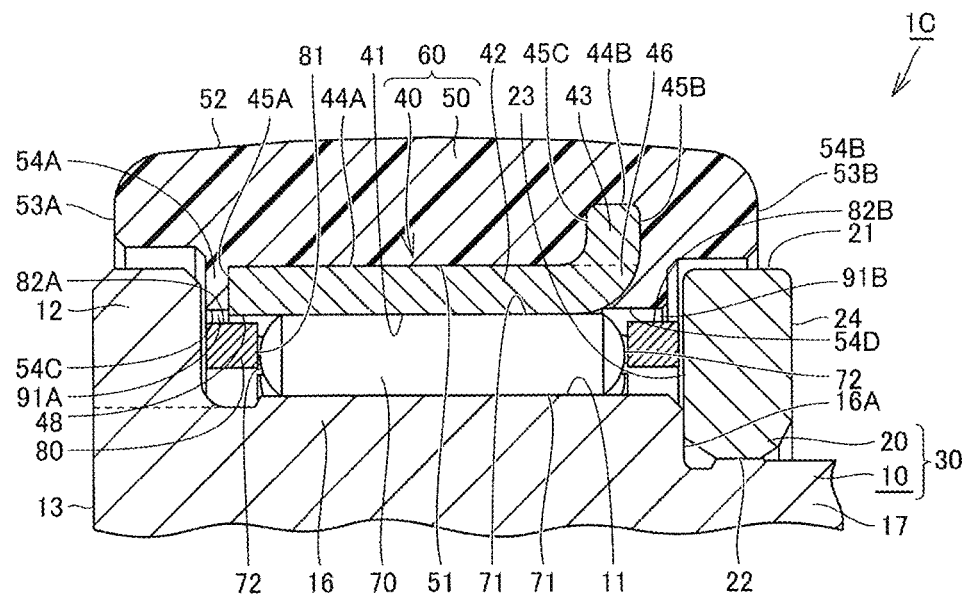
FIG. 11 is a schematic cross-sectional view of a portion of a follower bearing according to Embodiment 3.

A description will now be made of yet another embodiment, Embodiment 3. FIG. 11 is a schematic cross-sectional view of a portion of the follower bearing according to Embodiment 3. The follower bearing of Embodiment 3 differs from that of Embodiment 1 in that the tubular portion has an opposing region that opposes the outer circumferential surface of the cage in the radial direction.

Referring to FIG. 11, in a cross section of the follower bearing 1C according to Embodiment 3 cut in a plane including the rotational axis thereof, the tubular portion 42 has an axial length that is longer than that of the tubular portion 42 of Embodiment 1. The tubular portion 42 has an opposing region 48 that opposes the outer circumferential surface 82A of the cage 80 in the radial direction. The opposing region 48 is formed continuous with the second raceway surface 41.

According to the present embodiment, even when the outer ring 60 is deformed toward the inner circumference side due to a load applied from the outer circumference side or the like, the outer ring 60 will come into contact with the cage 80 in the opposing region 48 of the tubular portion 42. This can reduce the risk of contact between the cage 80 and the second member 50. Therefore, it becomes easier to ensure smooth rotation of the cage 80.

Embodiment 4

Figure 12:
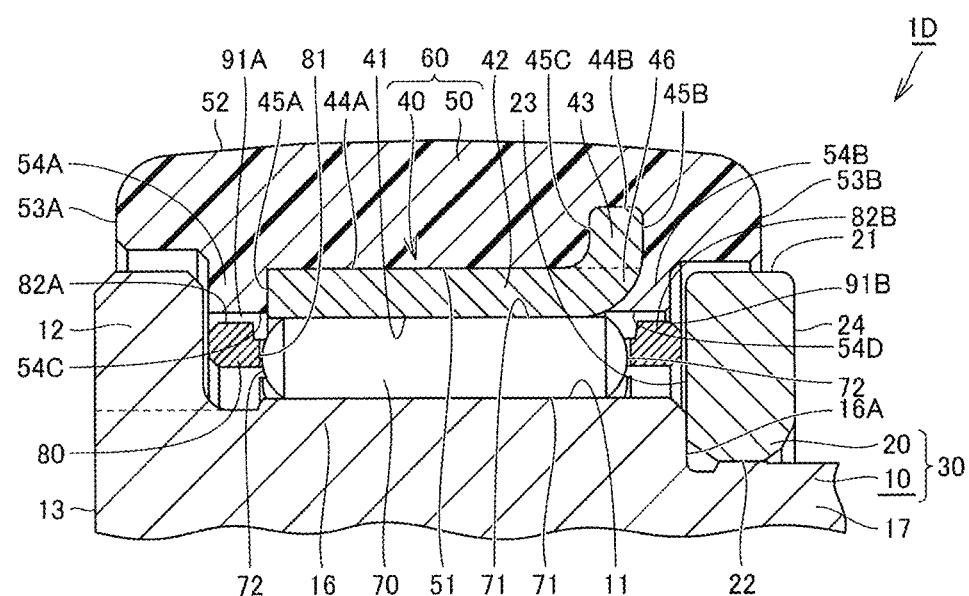
FIG. 12 is a schematic cross-sectional view of a portion of a follower bearing according to Embodiment 4.

A description will now be made of still yet another embodiment, Embodiment 4. FIG. 12 is a schematic cross-sectional view of a portion of the follower bearing according to Embodiment 4. The follower bearing of Embodiment 4 differs from that of Embodiment 1 in that the cage is a punched cage made of steel.

Referring to FIG. 12, the cage 80 included in the follower bearing 1D according to Embodiment 4 is a punched cage made of steel. With this configuration as well, stable operation of the bearing can be ensured.

Embodiment 5

Figure 13:
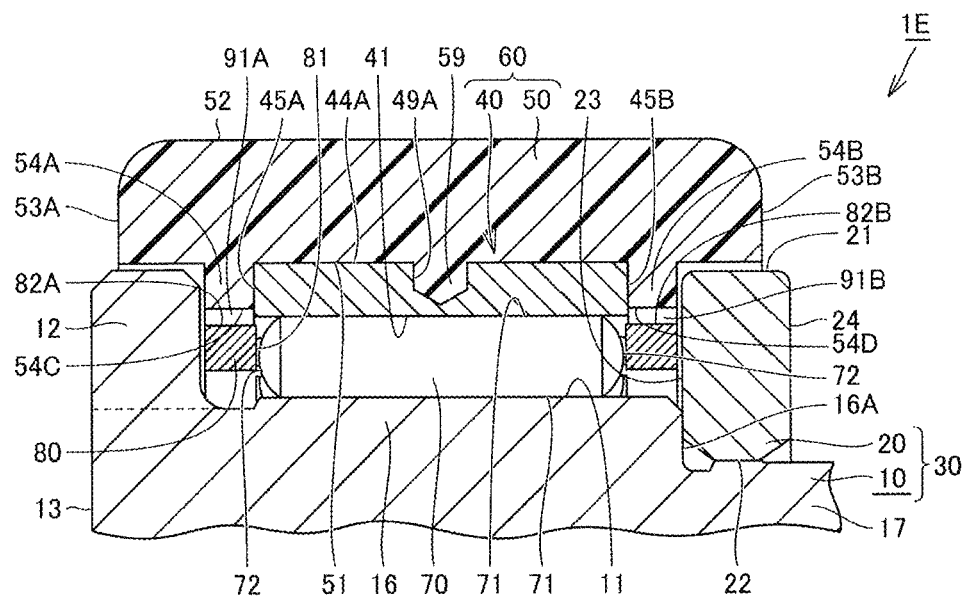
FIG. 13 is a schematic cross-sectional view of a portion of a follower bearing according to Embodiment 5.
Figure 14:
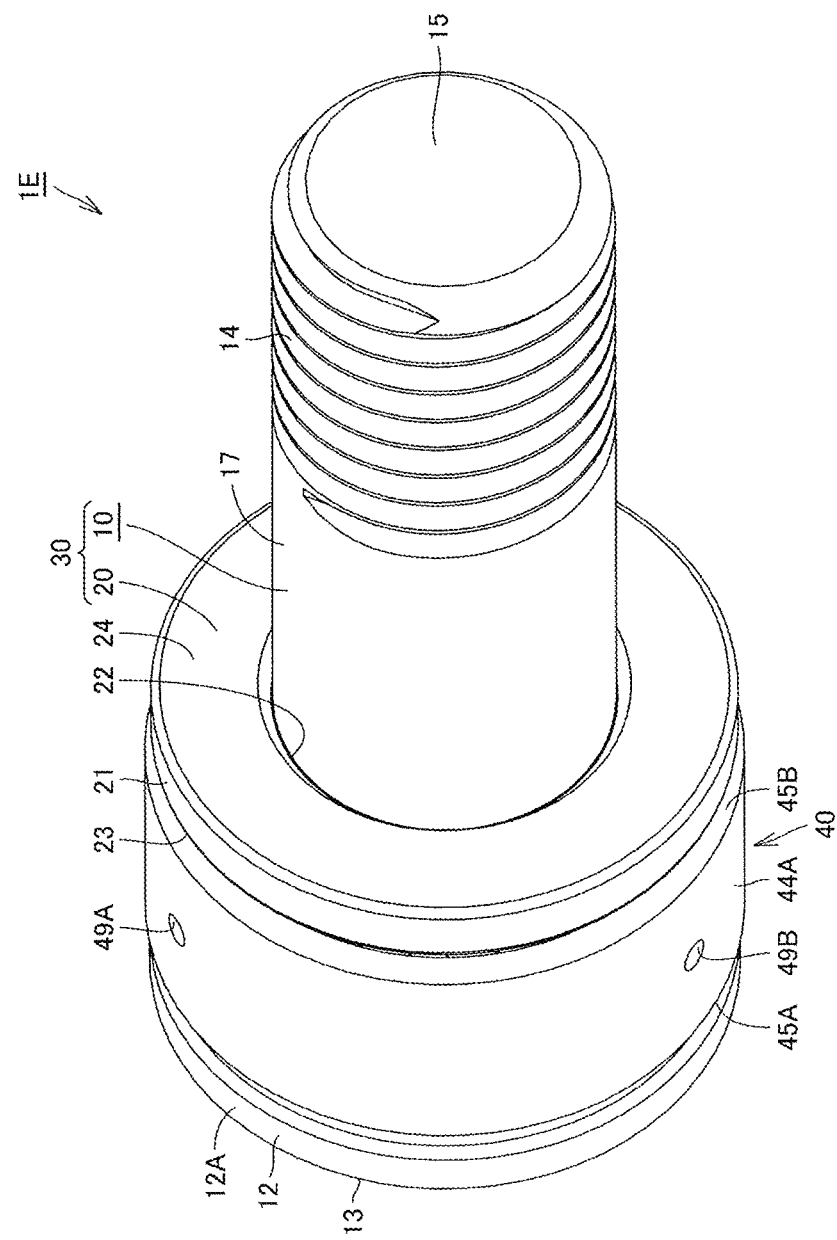
FIG. 14 is a schematic perspective view of the follower bearing according to Embodiment 5, with the second member omitted from the drawing.

A description will now be made of still yet another embodiment, Embodiment 5. FIG. 13 is a schematic cross-sectional view of a portion of the follower bearing according to Embodiment 5. FIG. 14 is a schematic perspective view of the follower bearing according to Embodiment 5, with the second member omitted from the drawing. The follower bearing of Embodiment 5 differs from that of Embodiment 1 in that the first member is provided with a concave portion as a rotation suppression mechanism to suppress the relative rotation of the second member in the circumferential direction with respect to the first member.

Referring to FIGS. 13 and 14, the follower bearing 1E according to Embodiment 4 includes, as the rotation suppression mechanism to suppress the relative rotation in the circumferential direction of the second member 50 with respect to the first member 40, concave portions 49A, 49B and a second member 59 that enters into the concave portions 49A, 49B. The concave portions 49A, 49B are concave in a round hole shape from the outer circumferential surface 44A of the tubular portion 42. A plurality of concave portions 49A, 49B are provided at intervals in the circumferential direction.

According to the present embodiment, the concave portions 49A, 49B and the second member 59 entering into the concave portions 49A, 49B can suppress the relative rotation of the second member 50 with respect to the first member 40. It can also regulate the movement in the axial direction of the second member 50 relative to the first member 40. Such a configuration can be easily formed by providing the concave portions 49A, 49B of the above configuration in the tubular portion 42 and then pouring resin into the concave portions 49A, 49B when providing the second member 50 on the outer circumference side of the first member 40.

Other Embodiments

In the follower bearings described above, the resin that constitutes the second member 50 may contain reinforcing fibers. For the reinforcing fibers, glass fibers or carbon fibers, for example, can be adopted.

While the case in which rollers 70 are adopted as the rolling elements of the follower bearing has been described in the above embodiments, balls may also be adopted as the rolling elements. While the case where rolling elements are arranged in a single row has been described in the above embodiments, they may be arranged in a plurality of rows. Further, while the case where a solid shaft member 30 is adopted as the inner member has been described in the above embodiments, a bearing ring (an inner ring), for example, may be adopted as the inner member. Furthermore, for the second member 50, one formed in a hollow cylindrical shape, one formed with a spherical outer surface, or the like can be selected as appropriate.

In the present disclosure, a follower bearing refers to a bearing in which, with the shaft member being fixed, the outer ring rotates in the circumferential direction relative to the shaft member while contacting another member. The other member is not particularly limited, and may be, for example, a cam, a rail, or a belt.

It should be understood that the embodiments disclosed herein are illustrative and non-restrictive in every respect. The scope of the present invention is defined by the terms of the claims, rather than the description above, and is intended to include any modifications within the scope and meaning equivalent to the terms of the claims.

The follower bearing according to the present invention is used particularly effectively when it is required to ensure stable operation of the bearing.

DESCRIPTION OF REFERENCE NUMERALS 1A, 1B, 1C, 1D, 1E: follower bearing; 10: body portion; 11: first raceway surface; 12: flange portion; 13, 23, 45A, 53A: first end face; 13A: hexagon hole; 14: screw portion; 15, 24, 45B, 53B: second end face; 16: large diameter portion; 16A: stepped surface; 17: shaft portion; 20: side plate; 21, 44A, 44B, 52, 71, 82A, 82B: outer circumferential surface; 22, 51: inner circumferential surface; 30: shaft member; 31: rotational axis; 40: first member; 41: second raceway surface; 42: tubular portion; 43: protruding portion; 45C: side surface; 46: end portion; 47: notch; 48: opposing region; 49A, 49B: concave portion; 50, 59: second member; 54A: first portion; 54B: second portion; 54C: first opposing surface; 54D: second opposing surface; 54E: tongue-shaped portion; 60: outer ring; 70: roller; 72: end face; 80: cage; 81: pocket; 91A, 91B: gap; and 92: load.

What is claimed is:

1. A follower bearing comprising:
an inner member having an annular first raceway surface on an outer circumferential surface thereof;
an outer ring having an annular second raceway surface on an inner circumferential surface thereof, the second raceway surface opposing the first raceway surface;
a plurality of rolling elements arranged between the first raceway surface and the second raceway surface; and
a cage that retains the plurality of rolling elements;
the outer ring including
an annular first member made of steel, and
an annular second member made of resin, the second member covering an outer circumferential surface of the first member,
the first member including a tubular portion having a hollow cylindrical shape, the tubular portion including the second raceway surface,
the second member including
a first portion arranged on one side of the tubular portion in an axial direction and having a first opposing surface that opposes an outer circumferential surface of the cage in a radial direction, and
a second portion arranged on another side of the tubular portion in the axial direction and having a second opposing surface that opposes the outer circumferential surface of the cage in the radial direction,
the first opposing surface and the second opposing surface being arranged radially outward of the second raceway surface.

2. The follower bearing according to claim 1, wherein in a cross section of the follower bearing cut in a plane including a rotational axis thereof,
the outer circumferential surface of the cage extends straight along the axial direction, and
the first and second opposing surfaces extend straight along the axial direction.

3. The follower bearing according to claim 1, wherein in a cross section of the follower bearing cut in a plane including a rotational axis thereof,
at least one of the first opposing surface and the second opposing surface is inclined with respect to the axial direction in such a manner that a distance from the outer circumferential surface of the cage increases from a side closer to the tubular portion to a side farther from the tubular portion.

4. The follower bearing according to claim 1, wherein at least one of the first portion and the second portion includes a portion that extends to the inner circumferential surface of the outer ring, even with the tubular portion of the first member of the outer ring, in a region bounded axially by the cage and the tubular portion.

5. The follower bearing according to claim 1, wherein the tubular portion has an opposing region that opposes the outer circumferential surface of the cage in the radial direction.

6. The follower bearing according to claim 1, wherein the tubular portion has an outer circumferential surface that extends straight along the axial direction.

7. The follower bearing according to claim 1, wherein the first member includes a protruding portion that extends radially outward from the tubular portion.

8. The follower bearing according to claim 1, further comprising a rotation suppression mechanism configured to suppress relative rotation of the second member in a circumferential direction with respect to the first member.

9. The follower bearing according to claim 8, wherein
the rotation suppression mechanism includes a concave portion that is concave in a round hole shape from an outer circumferential surface of the tubular portion, and
the second member has a portion that enters into the concave portion.

10. The follower bearing according to claim 1, wherein the cage is a welded cage.

11. The follower bearing according to claim 1, wherein the resin constituting the second member is composed of an elastomer.

12. The follower bearing according to claim 11, wherein the elastomer is a thermoplastic elastomer.

13. The follower bearing according to claim 1, wherein the rolling elements are rollers.

14. The follower bearing according to claim 1, wherein the plurality of rolling elements are arranged between the first raceway surface and the second raceway surface with the plurality of rolling elements contacting the first raceway surface and the second raceway surface.

* * * * *